Figure 1:
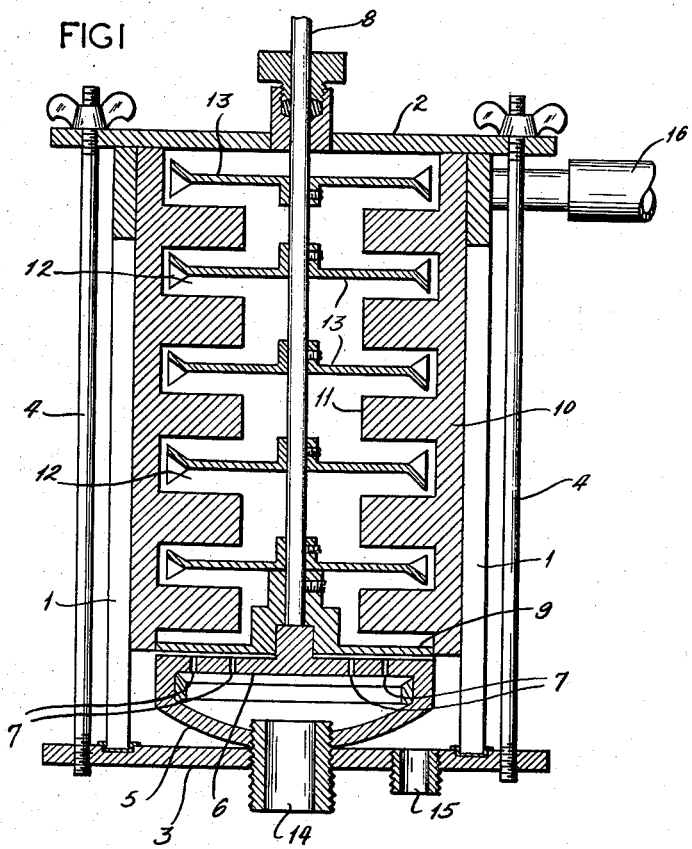

March 22, 1960

E. A. ANDREW 2,929,107

TREATMENT OF PLASTICS

Filed Nov. 22, 1954

INVENTOR
EUGENE A ANDREW
By
ATTORNEYS.

United States Patent Office 2,929,107
Patented Mar. 22, 1960

2,929,107

TREATMENT OF PLASTICS

Eugene A. Andrew, St. Louis, Mo., assignor to Olin Mathieson Chemical Corporation, East Alton, Ill., a corporation of Virginia Application November 22, 1954, Serial No. 470,412

5 Claims. (Cl. 18—47.5)

This invention relates to the manufacture of minute globules of plastic material, such as nitrocellulose esters, suitable for use as a plastic molding powder.

In the manufacture of propellant powders according to what is known as the globular powder process, nitrocellulose is formed into near-spheres by dispersing in an aqueous vehicle a lacquer composed of nitrocellulose and a water immiscible solvent, such as ethyl acetate. The lacquer, while suspended in the form of droplets in the aqueous medium, is solidified by distillation of the solvent from the lacquer. The resultant near spherical grains have heretofore been produced in sizes appropriate for propellant powder purposes, i.e., ranging from 0.009 inch in diameter upwardly to about 0.040 inch in diameter. In the range of from 0.009 inch to about 0.025 inch, it has been possible, as pointed out in Olsen Patent No. 2,027,114, to control the size of the grains constituting the major portion of a batch within the limits of ±0.003 inch by adjustment of the speed of agitation, adjustment of the viscosity of the lacquer and certain other variables, but the techniques employed in controlling the size of such globular grains within the ordinary propellant powder ranges have been found to be incapable of producing batches of such grains, the majority of which lie below 0.007 inch, or above 0.035 inch, although in many commercial batches, a few random grains below 0.007 or above 0.035 would be found.

It has heretofore been recognized that the globular powder process was applicable to the manufacture of near-spheres of a variety of plastic materials which were plasticizable by water immiscible solvents (such as ethyl acetate, isopropyl acetate, methyl ethyl ketone and four-to-one mixture of the latter with toluene) which may be distilled at temperatures below the boiling point of the aqueous medium in which globules of such lacquer were suspended. Among the materials which may conveniently be formed into near-spheres by this process are various molding plastics, among which are nitrocellulose and cellulose acetate. While efforts have heretofore been made to utilize the globular grains of nitrocellulose as a molding material, difficulties have been encountered in obtaining homogeneity in the resultant molded article, where such are employed. This seems to have been attributable in large measure to the magnitude of the spheres of nitrocellulose, or more specifically, to the magnitude of the voids between contiguous spheres when packed together. While in a given volume of perfectly packed spheres, the aggregate of void volume is the same regardless of whether the spheres are large or small, the controlling factor, as regards molding powders and the like, is the maximum web thickness of the void between each group of spheres. In the dry state, these voids will be occupied by air, but when the spheres are in a liquid slurry, the voids will be occupied by the liquid in which the spheres are carried. The maximum web thickness of such voids approximates the radius of the spheres, and consequently, the smaller the spheres, the smaller the web thickness of the voids. Where the spheres have a diameter on the order of 0.016 inch, the voids will thus have a maximum web thickness of on the order of 0.008 inch, and consequently, in any molding process wherein the molded product is required to become homogeneous, the material of the individual spheres must be forced in to fill the voids. The extent of the force required is determined not only by the viscosity of the plastic at the time the force is applied, but also by the maximum distance which an individual plasticized sphere must be compelled to flow in order to fill the void between it and the next sphere. Accordingly, it is an object of the present invention to provide a process of producing solidified near spherical bodies having a diameter less than seven thousandths of an inch, and preferably on the order of two thousandths of an inch.

The invention contemplates the manufacture of spheres, or near-spheres, of hardened plasticizable material having a diameter of less than 0.007 inch by forming a flaccid lacquer of the plasticizable material with a solvent which is substantially immiscible in water; forming a suspension of small bodies of the flaccid lacquer in an aqueous liquor; and then subjecting the suspension to liquid shear in order to disintegrate the lacquer bodies therein. The disintegrated lacquer bodies are maintained in such suspension until they round, and thereafter until the individual bodies are hardened by driving the solvent from them. By "liquid shear," as the expression is herein used, will be understood a process of attrition of the character accomplished by collision or side-swiping of liquid streams moving at high relative velocity in close quarters, as typified by the action of conventional homogenizers, and high speed turbo-mixers (as opposed to attrition by impact with or between solid members).

Nitrocellulose is illustrative of the plasticizable material to be treated in accordance with the invention. The nitrocellulose employed may be either dry, water-wet, or alcohol-wet, fibrous or pre-gelatinized, before being formed into the lacquer. The lacquer may be made with any solvent which is substantially immiscible in water and which may be readily removed from the lacquer bodies, as by vaporization. Suitable solvents are ethyl acetate, isopropyl acetate, methyl ethyl ketone, or a mixture consisting of four parts methyl ethyl ketone with one part toluene. The lacquer may also contain stabilizers, modifiers, and/or plasticizers, as the circumstances may require. The amount of solvent employed depends upon the viscosity which it is desired that the lacquer should have at the time of its sub-division into small bodies, and this in turn depends, among other things, upon their inherent viscosity of the nitrocellulose employed. For optimum results, a lacquer having a viscosity approximating that of lacquer composed of four parts by weight of ethyl acetate to each 1.35 parts of water-wet eight-second nitrocellulose (containing one part nitrocellulose and 0.35 part of water) at 48° C. is recommended. This recommended viscosity may be readily obtained with nitrocellulose of other inherent viscosity values, at different solvent ratios, for example, with quarter-second nitrocellulose, a ratio of 1.5 parts of ethyl acetate to each part of the nitrocellulose. The viscosity of the lacquer as extruded affects the ultimate particle size, and as a general rule, the particle size will decrease as the viscosity of the lacquer is decreased. There is, however, a tendency toward non-uniformity of end product if the viscosity of the lacquer is initially subdivided be less than the viscosity of a lacquer composed of 7.5 parts of ethyl acetate for each part of eight-second nitrocellulose (or three parts of ethyl acetate for each part of quarter-second nitrocellulose), or be greater than the viscosity of a lacquer composed of 1.5 parts of ethyl acetate to each part of eight-second nitrocellulose (or one-half part of ethyl acetate for each part of quarter-second nitrocellulose).

The flaccid lacquer is first subdivided into bodies small enough to be readily suspended in an aqueous suspending liquor. This is preferably accomplished by extruding the lacquer through an orifice having a diameter on the order of 0.015 to 0.030 inch and severing the extruded streams into slugs of substantially the same length. Such extrusion and severance may be accomplished by means of an apparatus such as that disclosed in the copending application of the undersigned and Ralph L. Cook, Serial No. 460,014, filed October 4, 1954. With such an apparatus, the lacquer slugs are suspended in aqueous suspending medium immediately as they are cut off. An appropriate aqueous suspending medium may be composed of ninety-four parts water, two parts gum arabic, two parts ethyl acetate, and two parts sodium sulphate.

The resultant suspension is then subjected to liquid shear to further disintegrate the suspended lacquer bodies and disperse the disintegrated lacquer particles in the suspending liquor as a quasi-emulsion wherein the flaccid lacquer particles, which constitute the internal phase, are on the order of 0.014 inch, or less, in diameter. While the lacquer particles are maintained in such state of quasi-emulsion, they are hardened by removing the solvent therefrom, as in the globular powder process. As the solvent is removed, the flaccid lacquer particles shrink to their final hardened size which, in the case of 4:1 solvent to nitrocellulose ratio lacquers, is on the order of fifty percent in volume. The shrinkage is greater when the ratio of solvent to nitrocellulose in the lacquer is increased, and vice-versa.

Figure 2:
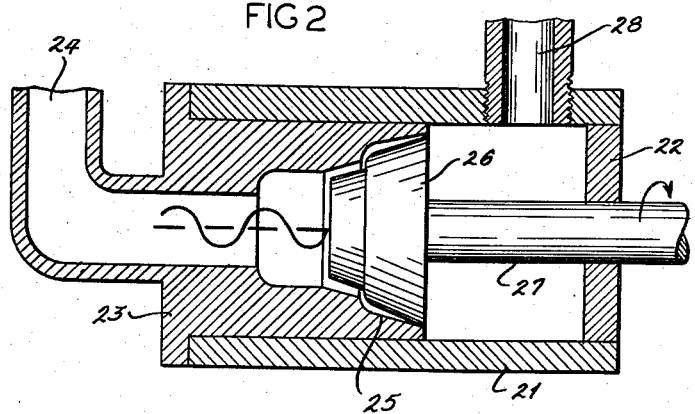

The disintegration by liquid shear may be accomplished by any well-known device for the purpose, and may, depending upon the results desired and the starting materials, consist of one or a plurality of successive liquid shear attritions. Where a plurality of successive liquid shear attritions are employed, the suspension may either be recycled through the same liquid shear device or passed in series through different ones. Two examples of suitable liquid shear attrition devices are shown in the accompanying drawings, in which:

Figure 1 is an axial sectional view of one form of apparatus suitable for accomplishing the extrusion and severance of the lacquer and subsequent disintegration of the severed slugs; and Figure 2 is an axial sectional view of another form of apparatus suitable for disintegrating previously severed slugs of lacquer.

In the form shown in Figure 1, the apparatus consists of a cylindrical vessel having a side wall 1 and end plates 2 and 3. The end plates are arranged to be drawn up taut into sealing engagement with the ends of side wall 1 by a series of bolts 4. In the bottom of the vessel there is provided an extrusion head 5 having an orifice plate 6, in which a plurality of extrusion orifices 7 are formed. The apparatus is provided with a rotor having a shaft 8, driven from an external source so as to rotate at a relatively high rotational speed. On the lower end of the shaft 8 there is provided a series of radially extending cutter blades 9 which ride upon the upper surface of orifice plate 6, and, in rotation, to sever at each pass of orifice 7, slugs of the lacquer being extruded through such orifices from an external source of pressure.

Within the side walls 1, a stator 10 is provided, having a series of axially spaced baffles 11 which extend circumferentially of the interior of the stator. Between each pair of the baffles 11 a shear chamber 12 is defined. Turbine blades 13 mounted on, and rotatable with, shaft 8 are accommodated in each of the shear chambers with clearance therein to effect the desired lacquer particle size reduction. The clearance in any case will exceed the size to which the lacquer particles are to be reduced, and will vary with the speed of the turbine, the viscosity of the lacquer and the dimensions of the graining chamber; the clearance being increased if the speed be increased, or if the viscosity of the lacquer be decreased, or if size of chamber be increased. The turbine blades are preferably pitched to oppose the pressure exerted by incoming liquids, to wit: the lacquer which is forced in from an external source through inlet 14, and the suspending liquor which is forced in from an externanl source through inlet 15. As shown in the drawings, both the lacquer and the liquor are continuously forced upwardly, and the mixture is continuously discharged from the vessel through a tangential outlet 16. Since the general flow trend is upward in the form shown in the drawings, the several turbine blades 13 are pitched to cause the suspension of lacquer particles to recycle through the blades several times before being released at the top of the vessel.

With an apparatus of the type shown in Figure 1, utilizing the lacquer of the above-recommended viscosity and composition, with the orifices 7 having a diameter of 0.015 inch while the shaft 8 rotates at fifteen hundred r.p.m., with shear chambers 12 having a diameter of six inches and with a clearance of 0.125 inch between blades 13 and chambers 12, the output of the disintegrator is delivered to a suitable hardening still wherein the solvent is distilled from the individual particles of lacquer while the latter are maintained in the state of quasi-emulsion within the suspending liquor. Such an operation produces batches of hardened near-spheres of gelatinized nitrocellulose, 95% or more of the yield of which is less than 75 microns in diameter.

With the apparatus of Figure 1, the viscosity of the lacquer as extruded should not exceed that of a lacquer composed of one part of ethyl acetate to each part quarter-second nitrocellulose (or two and one-half parts of ethyl acetate to each part of eight-second nitrocellulose) at 48° C. Higher viscosity lacquers do not seem to disintegrate uniformly. The viscosity of the lacquer may, however, be as low as that corresponding to three parts of ethyl acetate to each part of quarter-second nitrocellulose (or seven and one-half parts of ethyl acetate to each part of eight-second nitrocellulose).

The apparatus shown in Figure 2 may be utilized in situations where the initial subdivision of the lacquer into small bodies and suspension thereof in the aqueous liquor is previously accomplished, as by extrusion and severance of the lacquer and suspension thereof in an apparatus such as that described in the copending application of Ralph L. Cook et al., above-mentioned.

The apparatus shown in Figure 2 is a conventional homogenizing device consisting of a cylindrical wall 21, an end closure 22 and an end closure 23. The end closure 23 is provided with a feed inlet 24 for conveying the externally made suspension of lacquer extrusion slugs, and delivering the same axially of the device. The interior of end closure 23 is shaped at 25 to provide a stator to cooperate with a rotor 26 which latter is mounted on shaft 27, and driven at a high rate of speed from a suitable exterior source. In a device of this character, the clearance between rotor 26 and recess 25 may be varied by adjustment of position of the rotor axially of shaft 27. The suspension of lacquer extrusion slugs in the suspending medium is thus fed in through inlet 24 and forced through the space between rotor 26 and stator 25, where the suspension is subjected to liquid shear forces of a high order, and the end product discharged through an outlet 28. It is contemplated that a series of devices of the kind just described be provided so that the product of one such device may immediately be acted upon by a similar such device operating at either the same or a different clearance between its rotor and stator. Alternatively, the product discharged by one device may be recycled through the same homogenizer device operating at the previous, or a different clearance.

In a typical run of the process utilizing the device shown in Figure 2, the lacquer was made with eight-second nitrocellulose (13.2% $N_2$) utilizing four parts of ethyl acetate to each part of nitrocellulose. This lacquer was extruded and cut into slugs, each having a diameter and length of about 0.040 inch, and suspended in double its weight of an aqueous liquor consisting of ninety-four parts water, two parts gum arabic, two parts ethyl acetate, and two parts sodium sulphate. The suspension of lacquer slugs was put through the homogenizer set with a clearance between the rotor and stator of 0.0005 inch at the rate of one to two gallons per minute while rotating at five thousand r.p.m. In passing through the homogenizer the lacquer bodies were disintegrated into flat flaccid particles which readily round out into spheres of diameter greater than the space through which they have passed. The output of the homogenizer was temporarily stored and recycled through the homogenizer a second time. Thereafter, the homogenizer product was discharged into a hardening vessel where the solvent was removed to solidify the globules. The end product consisted of near-spheres all of which had diameters between 0.004 inch and 0.002 inch.

With the apparatus of Figure 2, lacquers having a viscosity as high as that of one-half part of ethyl acetate to each part of quarter-second nitrocellulose (or one and one-half parts of ethyl acetate to each part of eight-second nitrocellulose) at 48° C., can, quite satisfactorily, be disintegrated and reduced to the state of quasi-emulsion within the suspending liquor.

If desired, the apparatus shown in Figure 1 may be operated in series with that shown in Figure 2 so that the former carries out the preliminary disintegration and suspension of the lacquer while the latter homogenizes the suspension.

From the foregoing description, it will be apparent that the present invention provides a process of manufacturing minute near-spheres of gelatinized nitrocellulose, cellulose acetate, and other similarly plasticizable materials. These near-spheres are characterized by an exterior skin which is more resistant to re-plasticization than the interiors thereof. Consequently, the minute spheres of the present invention may be incorporated as a slurry with an appropriate solvent for a molding operation without immediate development of objectionable viscosity. Since the minute spheres are inherently free flowing, incorporation of them in a slurry with a low viscosity solvent does not reduce the flowability of the slurry until the solvent therein has substantially softened the individual spheres. In view of the greater resistivity of the skins of the individual spheres to the action of solvents, a considerable time may elapse between the preparation of the slurry and the actual charging of it into molds. This is a substantial convenience when slurries are made up in quantities such as to charge a plurality of molds in succession, or to recharge a given mold a plurality of times, as the slurry of molding powder retains a free flowing property until it is poured into the mold and subjected there to heat, or pressure, or both. The solvent resistant skin above-mentioned when once plasticized by the solvent permits access of the solvent to the interiors of the spheres which plasticize more rapidly. As indicated above, the plasticization may be expedited, as is well known, by the application of heat or pressure, or both. Thus when the individual spheres are plasticized throughout, they may be readily forced into the voids of small magnitude which exist between the hard spheres as packed into a mold to form a homogeneous molded product.

While two different forms of liquid shear attrition devices have been disclosed, and specific compositions and viscosities have been recommended, it is not to be understood that the invention is limited to such details. On the contrary, the invention envisions the liquid shear disintegration of flaccid lacquer bodies while in suspension in a non-solvent medium irrespective of the apparatus employed or the composition of the materials treated, save as indicated in the appended claims.

Having thus described the invention, what is claimed and desired to be secured by Letters Patent is:

1. In the manufacture of minute globules of hardened plasticizable material having a particle size up to about 0.007 inch from a flaccid lacquer of the plasticizable material and water-immiscible solvent, the process comprising, extruding the lacquer directly into an aqueous suspending medium, immediately severing slugs from the extruded lacquer in the suspending medium, immediately suspending said slugs in an aqueous suspending medium, subjecting the slugs to liquid shear while in said aqueous suspending liquor to disintegrate the slugs and disperse the disintegrated particles in the suspending liquor, and while so dispersed removing the solvent from the suspended lacquer particles.

2. The process of claim 1 wherein the lacquer has a viscosity approximating that of eight-second nitrocellulose in four times its weight of ethyl acetate.

3. The process of claim 1 wherein the viscosity of the lacquer is within the range between that of a lacquer having 7.5 parts ethyl acetate for each part of eight-second nitrocellulose and that of a lacquer having 1.5 parts of ethyl acetate for each part of eight-second nitrocellulose.

4. The process of claim 1 wherein the length and breadth of the slugs are substantially equal.

5. The process of claim 1 wherein the flaccid lacquer slugs are subjected to liquid shear a plurality of times before the solvent is removed therefrom.

References Cited in the file of this patent

UNITED STATES PATENTS

| | | |
|---|---|---|
| 1,999,873 | Frost | Apr. 30, 1935 |
| 2,027,114 | Olsen | Jan. 7, 1936 |
| 2,213,255 | Olsen | Sept. 3, 1940 |
| 2,491,231 | Travis et al. | Dec. 13, 1949 |
| 2,610,171 | Nyquist | Sept. 9, 1952 |
| 2,691,800 | Seavey | Oct. 19, 1954 |
| 2,706,108 | Miner | Apr. 12, 1955 |
| 2,740,705 | O'Neill et al. | Apr. 3, 1956 |
| 2,768,054 | Armento et al. | Oct. 23, 1956 |